(12) United States Patent
Kato et al.

(10) Patent No.: US 6,337,942 B1
(45) Date of Patent: Jan. 8, 2002

(54) OPTICAL FIBER

(75) Inventors: Takatoshi Kato; Kazuhiro Okamoto; Mitsuomi Hada; Shinjiro Hagihara; Morio Watanabe; Kohei Kobayashi, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/441,550

(22) Filed: Nov. 17, 1999

(30) Foreign Application Priority Data

Dec. 17, 1998 (JP) .......................................... 10-359352

(51) Int. Cl.[7] .............................................. G02B 6/22
(52) U.S. Cl. ....................................... 385/127; 385/126
(58) Field of Search .................................. 385/123–127

(56) References Cited

U.S. PATENT DOCUMENTS

| 5,360,464 | A | * | 11/1994 | Yamauchi et al. ............. 65/410 |
| 5,835,655 | A | * | 11/1998 | Liu et al. ..................... 385/124 |
| 5,878,182 | A | * | 3/1999 | Peckham ..................... 385/123 |
| 5,999,679 | A | * | 12/1999 | Antos et al. ................. 385/127 |
| 6,072,929 | A | * | 6/2000 | Kato et al. .................. 385/123 |

FOREIGN PATENT DOCUMENTS

| EP | 0 724 171 | 7/1996 |
| EP | 0 779 524 | 6/1997 |
| EP | 0 883 002 | 12/1998 |
| FR | 1030200 A1 | * 8/2000 | ............ G02B/6/22 |

OTHER PUBLICATIONS

Derwent abstract for EP 1,030,200–A1.*
"170 Gb/s Transmission Over 10,850 km Using Large Core Transmission Fiber", M. Suzuki et al., OFC '98 PD, pp. 17–1 through 17–4.
"213 Gbit/s (20X10.66Gbit/s), over 9000km Transmission Experiment using Dispersion Slope Compensator", H. Taga et al., OFC '98 PD, pp. 13–1 through 13–4.

* cited by examiner

Primary Examiner—Hemang Sanghavi
Assistant Examiner—Omar Rojas, Jr.
(74) Attorney, Agent, or Firm—McDermott, Will & Emery

(57) ABSTRACT

The present invention relates to an optical fiber having a large positive dispersion in a wavelength band of 1.55 μm in order to compensate for a negative dispersion inherent in an NZ-DSF in the wavelength band of 1.55 μm. This optical fiber comprises a depressed cladding structure constituted by a core region; an inner cladding, disposed at the outer periphery of the core region, having a lower refractive index; and an outer cladding having a higher refractive index. In this optical fiber, the relative refractive index difference of the core region with respect to the outer cladding is at least 0.30% but not greater than 0.50%, and the relative refractive index difference of the inner cladding with respect to the outer cladding is at least −0.50% but not greater than −0.02%. Also, the optical fiber has a dispersion greater than 18 ps/nm/km at a wavelength of 1.55 μm, and an effective cross-sectional area $A_{eff}$ of at least 70 μm² at the wavelength of 1.55 μm.

15 Claims, 8 Drawing Sheets

OPTICAL FIBER

BACKGROUND OF THE INVENTION

1. Field of the Invention

The present invention relate to an optical fiber applicable to a module installed in a part of an optical transmission line or on the optical transmission line in an optical transmission system which carries out WDM communications mainly in a 1.55-μm wavelength band.

2. Related Background Art

WDM (Wavelength Division Multiplexing) communication systems enable large-capacity, high-speed optical communications by transmitting a plurality of signal light components in the 1.55-μm wavelength band (1.53 μm to 1.57 μm). Since optical transmission systems carrying out such WDM communications preferably have a low dispersion in the 1.55-μm wavelength band so as to be able to transmit signal light in a wide wavelength band, a dispersion-shifted optical fiber whose zero-dispersion wavelength is shifted to the 1.55-μm wavelength band (DSF: Dispersion Shifted Fiber) has been utilized in their optical transmission lines.

If the dispersion in the 1.55-μm wavelength band is substantially zero, however, then four-wave mixing, which is a kind of nonlinear optical phenomena, may occur, whereby the signal light at the time of reception is likely to deteriorate (see, for example, H. Taga, et al., OFC'98, PD13). Therefore, a dispersion-shifted optical fiber whose zero-dispersion wavelength is further shifted to the longer wavelength side so that the dispersion at a wavelength of 1.55 μm is set to about -2 ps/nm/km (no zero-dispersion wavelength exists in the signal wavelength band) (NZ-DSF: Non-zero Dispersion Shifted Fiber) has conventionally been employed in optical transmission lines, so as to suppress the four-wave mixing. Since the above-mentioned NZ-DSF has a negative dispersion in the 1.55-μm wavelength band, there are cases where a dispersion-compensating optical fiber having a positive dispersion in the 1.55-μm wavelength band is employed in an optical transmission line together with the NZ-DSF (see, for example, M. Suzuki, et at., OFC'98, PD17).

As the above-mentioned dispersion-compensating optical fiber, optical fibers defined by G652 and G654 standards of ITU-T, for example, have been known. The optical fiber of G652 standard is a regular optical fiber constituted by a core region made of Ge-doped silica and a cladding region made of pure silica. This optical fiber of G652 standard has a zero-dispersion wavelength in a 1.3-μm wavelength band and a dispersion of about 17 ps/nm/km in the 1.55-μm wavelength band. On the other hand, the optical fiber of G654 standard has a dispersion of 20 ps/nm/km or less in the 1.55-μm wavelength band. Further, an optical fiber, constituted by a core region made of pure silica and a cladding region made of F-doped silica, having a dispersion of about 18 ps/nm/km in the 1.55-μm wavelength band is also used as a dispersion-compensating optical fiber.

Since a conventional optical transmission line thus constituted by the NZ-DSF and the dispersion-compensating optical fiber has a positive dispersion slope as a whole, though the dispersion becomes zero in one wavelength in the 1.55-μm wavelength band, it does not become zero in the other wavelength regions. Therefore, in order to compensate for the residual dispersion in the other wavelength regions, the signal light in the other wavelength regions is demultiplexed in a base station or the like, so that the dispersion of each signal light component is compensated for by use of a dispersion-compensating optical fiber of G652 or G654 standard. Here, the dispersion slope is given by the gradient of the curve indicating the dependence of the dispersion upon wavelength.

SUMMARY OF THE INVENTION

As a result of studies concerning the above-mentioned prior art, the inventors have found the following problems. Namely, since the upper limit of dispersion in the 1.55-μm wavelength band exceeds 20 ps/nm/km in the above-mentioned dispersion-compensating optical fiber of G654 standard, it is needed to be elongated so as to compensate for the negative dispersion inherent in the NZ-DSF in the 1.55-μm wavelength band. Also, in optical fibers having a simple step-like refractive index profile composed of a core region and a cladding region, the upper limit of dispersion is determined according to the upper limit of cutoff wavelength, whereby it is difficult to enhance the dispersion in the 1.55-μm wavelength band.

In order to overcome the problems such as those mentioned above, it is an object of the present invention to provide an optical fiber which has a large positive dispersion in the 1.55-μm wavelength band, and compensates for the negative distribution inherent in the NZ-DSF in the 1.55-μm wavelength band.

The optical fiber according to the present invention comprises a core region extending along a predetermined axis, and a cladding region disposed at the outer periphery of the core region. The cladding region has a depressed cladding structure comprising an inner cladding which is a region disposed at the outer periphery of the core region, and an outer cladding which is a region disposed at the outer periphery of the inner cladding and has a refractive index lower than that of the core region but higher than that of the inner cladding. Also, in this optical fiber, the relative refractive index difference of the core region with respect to the outer cladding is at least 0.30% but not greater than 0.50%, and the relative refractive index difference of the inner cladding with respect to the outer cladding is at least -0.50% but not greater than -0.02%. At a wavelength of 1.55 μm, the optical fiber has a dispersion greater than 18 ps/nm/km and an effective cross-sectional area $A_{\mathit{eff}}$ of at least 70 μm².

As indicated in Japanese Patent Application Laid-Open No.8-248251 (EP 0 724171 A2), the effective cross-sectional area $A_{\mathit{eff}}$ is given by the following expression (1):

$$A_{\mathit{eff}} = 2\pi \left( \int_0^\infty E^2 r \, dr \right)^2 \Big/ \left( \int_0^\infty E^4 r \, dr \right) \tag{1}$$

where E is the electric field accompanying the propagated light, and r is the radial distance from the core center.

Since this optical fiber has a large dispersion in the 1.55-μm wavelength band as such, a short length is sufficient when compensating for the negative dispersion inherent in the NZ-DSF in the 1.55-μm wavelength band. As a consequence, it is favorable in that, when the optical fiber is wound at a predetermined diameter so as to form a module, the resulting module can be made smaller. Also, since the effective cross-sectional area at the wavelength of 1.55 μm is large, nonlinear optical phenomena can effectively be restrained from occurring. In addition to the characteristics mentioned above, the optical fiber according to the present invention preferably has a dispersion of 20 ps/nm/km or greater at the wavelength of 1.55 μm. Since this optical fiber has a greater dispersion in the 1.55-μm wavelength band, it can be made shorter when compensating for the negative dispersion inherent in the NZ-DSF in the 1.55-μm wavelength band, whereby it becomes easier to reduce the dimensions of a dispersion-compensating module to which the optical fiber is applied. In particular, for realizing various characteristics at the wavelength of 1.55 μm, each of the optical fibers having the configurations mentioned above preferably satisfies the relationships of:

$$2.0 \leq 2b/2a \leq 6.0$$

$$8.3 \leq 2a \leq 13.0$$

where $2a$ (unit: μm) is the outside diameter of the core region, and $2b$ (unit: μm) is the outside diameter of the inner cladding.

The optical fiber according to the present invention may have a configuration comprising a core region which extends along a predetermined axis and has an outside diameter of at least 9.5 μm but not greater than 13.0 μm, and a cladding region having a refractive index lower than that of the core region. In such a configuration, the relative refractive index difference of the core region with respect to the cladding region is at least 0.3% but not greater than 0.5%. Also, the dispersion at the wavelength of 1.55 μm is at least 20 ps/nm/km, and the effective cross-sectional area $A_{\mathit{eff}}$ at the wavelength of 1.55 μm is at least 70 μm². Since this optical fiber also has a large dispersion in the 1.55-μm wavelength band, a short length is sufficient when compensating for the negative dispersion inherent in the NZ-DSF in the 1.55-μm wavelength band. Also, since the effective cross-sectional area at the wavelength of 1.55 μm is large, nonlinear optical phenomena are effectively restrained from occurring.

Preferably, each of the optical fibers having various configurations mentioned above has a transmission loss of 0.215 dB/km or less at the wavelength of 1.55 μm when wound like a coil at a diameter of 60 mm, and a polarization mode dispersion of 0.25 ps·km$^{-\frac{1}{2}}$ or less at the wavelength of 1.55 μm. In this case, sufficient characteristics can be obtained in the optical fiber according to the present invention even in a configuration in which it is wound like a coil so as to form a module.

As a further preferred optical characteristic, the optical fiber according to the present invention has an effective cross-sectional area $A_{\mathit{eff}}$ of 90 μm² or greater. Also, this optical fiber has a cutoff wavelength of 1.4 μm or greater at a fiber length of 2 m. Further, this optical fiber has a transmission loss of 0.180 dB/km or less at the wavelength of 1.55 μm.

The inventors have experimentally confirmed that providing a carbon coating on the surface of the optical fiber according to the present invention is effective in preventing the optical fiber from breaking.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1A is a view showing a cross-sectional structure of a first embodiment of the optical fiber according to the present invention, whereas

FIG. 6A is a chart showing the refractive index profile of an applied example of the optical fiber according to the first embodiment, whereas

FIG. 8A is a view showing a cross-sectional structure of a second embodiment of the optical fiber according to the present invention, whereas

DESCRIPTION OF THE PREFERRED EMBODIMENTS

In the following, embodiments of the optical fiber according to the present invention will be explained with reference to FIGS. 1A, 1B, 2 to 5, 6A, 6B, 7, 8A, 8B, and 9. Among the drawings, constituents identical to each other will be referred to with numerals or letters identical to each other, without repeating their overlapping descriptions.

(First Embodiment)

Figure 1A:
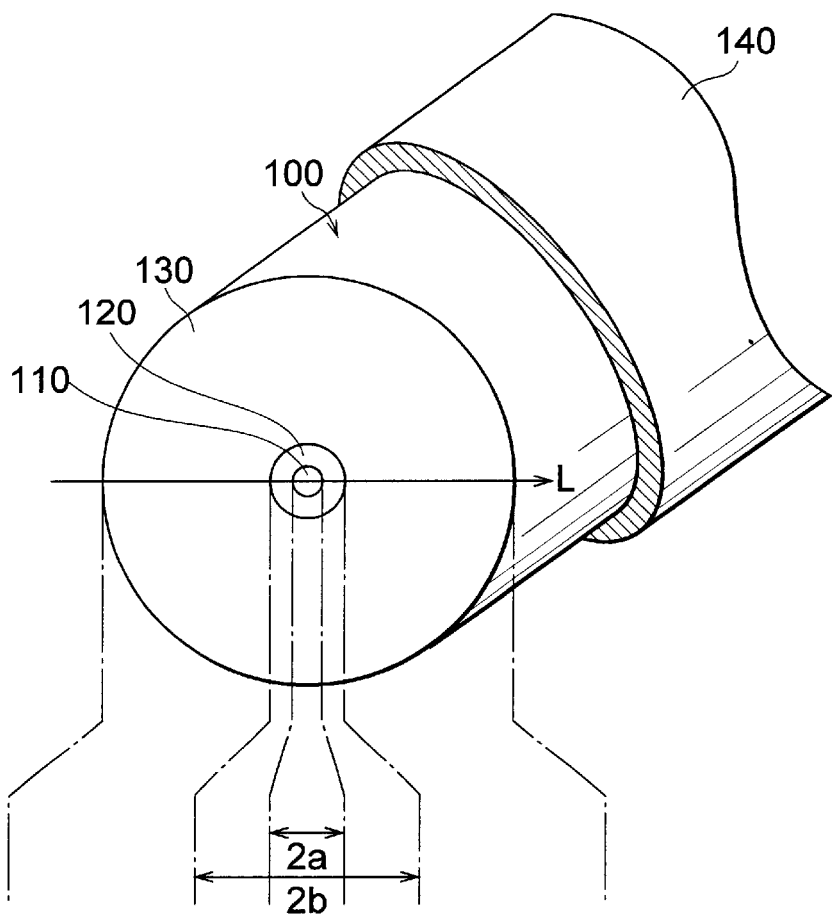
Figure 1B:
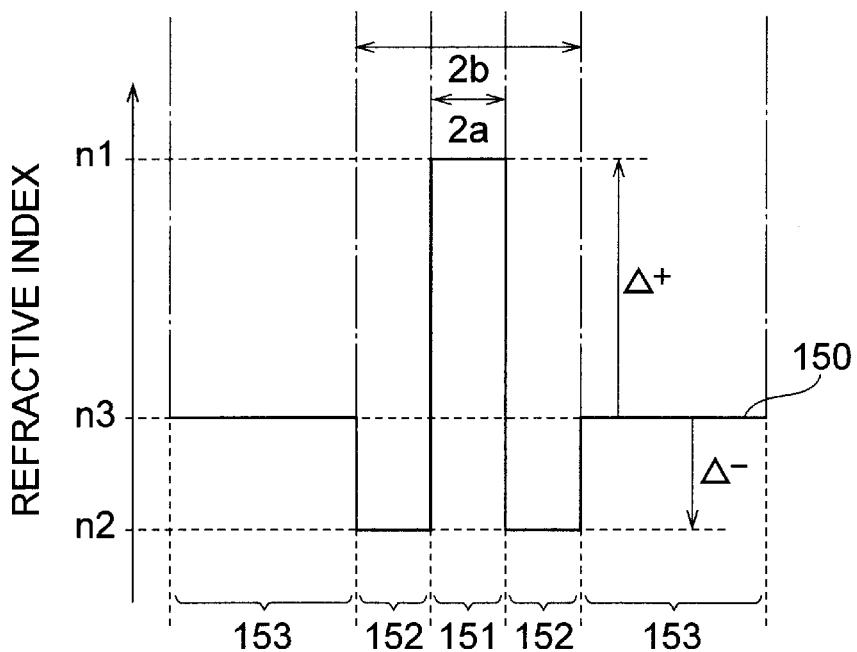
FIG. 1B is a chart showing a refractive index profile of the optical fiber shown in FIG. 1A.

FIG. 1A is a view showing a cross-sectional structure of the optical fiber according to the first embodiment, whereas FIG. 1B is a refractive index profile of the optical fiber shown in FIG. 1A. The optical fiber 100 according to the first embodiment comprises a core region 110 extending along a predetermined axis and having a refractive index $n_1$ and an outside diameter $2a$ ($\mu$m), and a cladding region disposed at the outer periphery of the core region 110. For realizing a depressed cladding structure, the cladding region further has an inner cladding 120, which is a region disposed at the outer periphery of the core region 110 and has a refractive index $n_2$ ($<n_1$) and an outside diameter $2b$, and an outer cladding 130, which is a region disposed at the outer periphery of the inner cladding 120 and has a refractive index $n_3$ ($<n_1$, $>n_2$). Therefore, the respective refractive indices in the regions 110, 120, and 130 have a relationship of $n_1>n_3>n_2$ in terms of magnitude. The outer periphery of the optical fiber 100 according to the first embodiment is provided with a carbon coating 140 for effectively preventing the fiber from breaking when it is wound like a coil so as to form a module.

The abscissa of the refractive index profile 150 shown in FIG. 1B corresponds to individual parts along the line L in FIG. 1A on a cross section perpendicular to the center axis of the core region 110. Therefore, in the refractive index profile 150 of FIG. 1B, regions 151, 152, and 153 indicate the respective refractive indices in individual parts on the line L in the core region 110, inner cladding 120, and outer cladding 130.

The optical fiber having such a refractive index profile 150 is a single-mode optical fiber based on silica, which can be realized, for example, by adding Ge and F elements to the core region 110 and the inner cladding 120, respectively. In FIGS. 1A and 1B, $2a$ indicates the outside diameter of the core region 110, whereas $2b$ indicates the outside diameter of the inner cladding 120. $\Delta^+$ and $\Delta^-$ indicate the respective relative refractive index differences of the core region 110 and inner cladding region 120 with respect to the outer cladding 130. Here, the relative refractive index difference $\Delta^+$ of the core region 110 with respect to the outer cladding 130 and the relative refractive index difference $\Delta^-$ of the inner cladding 120 with respect to the outer cladding 130 are defined respectively as follows:

$$\Delta^+=(n_1-n_3)/n_3$$

$$\Delta^-=(n_2-n_3)/n_3$$

where $n_1$ is the refractive index of the core region 110, $n_2$ is the refractive index of the inner cladding 120, and $n_3$ is the refractive index of the outer cladding 130. In this specification, the relative refractive index difference $\Delta$ is represented by percentage, and the respective refractive indices of individual regions in each defining expression may be arranged in any order. Consequently, the case where $\Delta$ is a negative value indicates that the refractive index of its corresponding region is lower than the that of the outer cladding 130.

In the optical fiber 100 according to the first embodiment, the relative refractive index difference $\Delta^+$ of the core region 110 with respect to the outer cladding 130 is at least 0.30% but not greater than 0.50%, whereas the relative refractive index difference $\Delta^-$ of the inner cladding 120 with respect to the outer cladding 130 is at least −0.50% but not greater than −0.02%. Also, the dispersion at the wavelength of 1.55 $\mu$m is greater than 18 ps/nm/km, and the effective cross-sectional area $A_{eff}$ at the wavelength of 1.55 $\mu$m is at least 70 $\mu$m$^2$.

Figure 2:
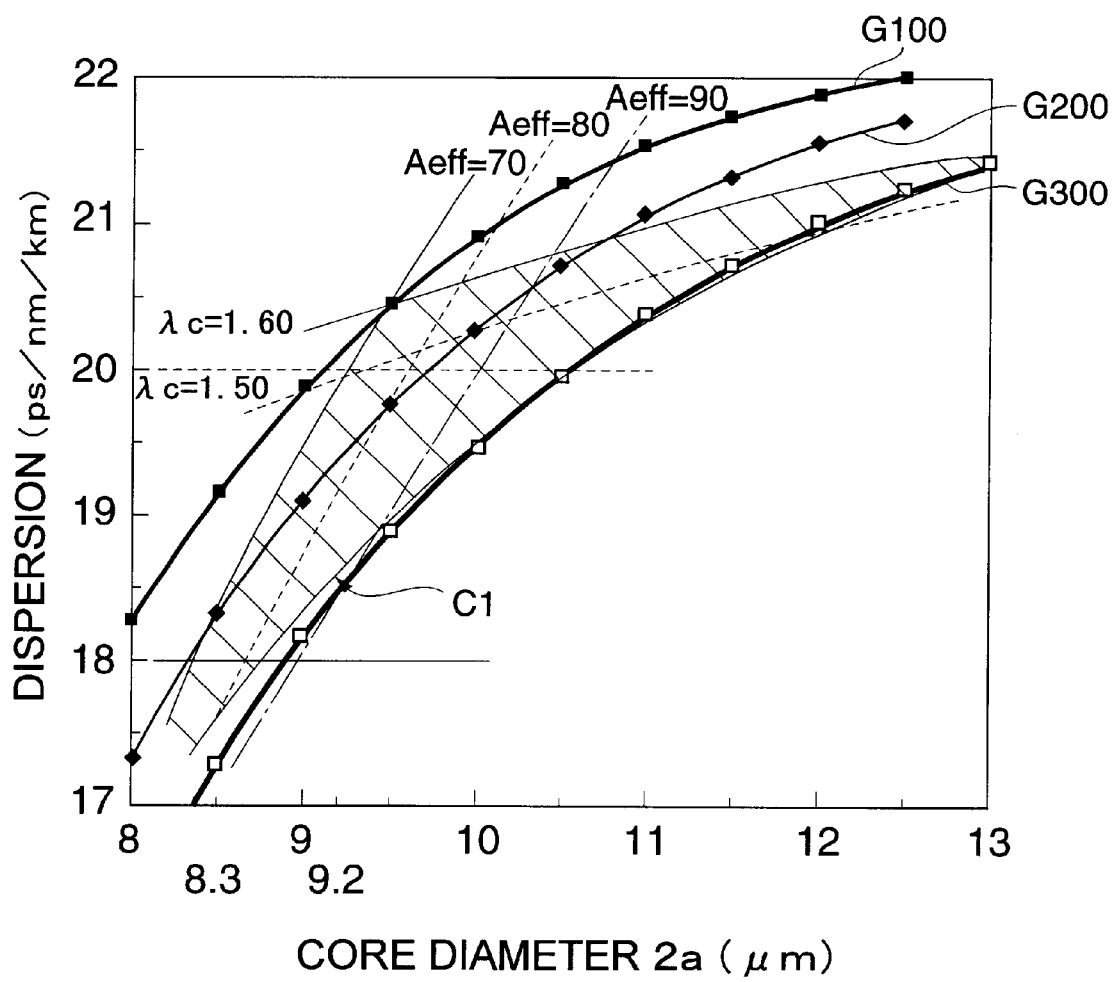
FIG. 2 is a graph showing relationships between the core diameter (outside diameter of the core region) and the dispersion at a wavelength of 1550 nm in the optical fiber according to the first embodiment in the case where the ratio ($2b/2a$) of the outside diameter $2b$ of the inner cladding to the outside diameter $2a$ of the core region is fixed at 4.0, whereas the relative refractive index difference $\Delta^-$ of the inner cladding with respect to the outer cladding is fixed at $-0.03\%$.
Figure 3:
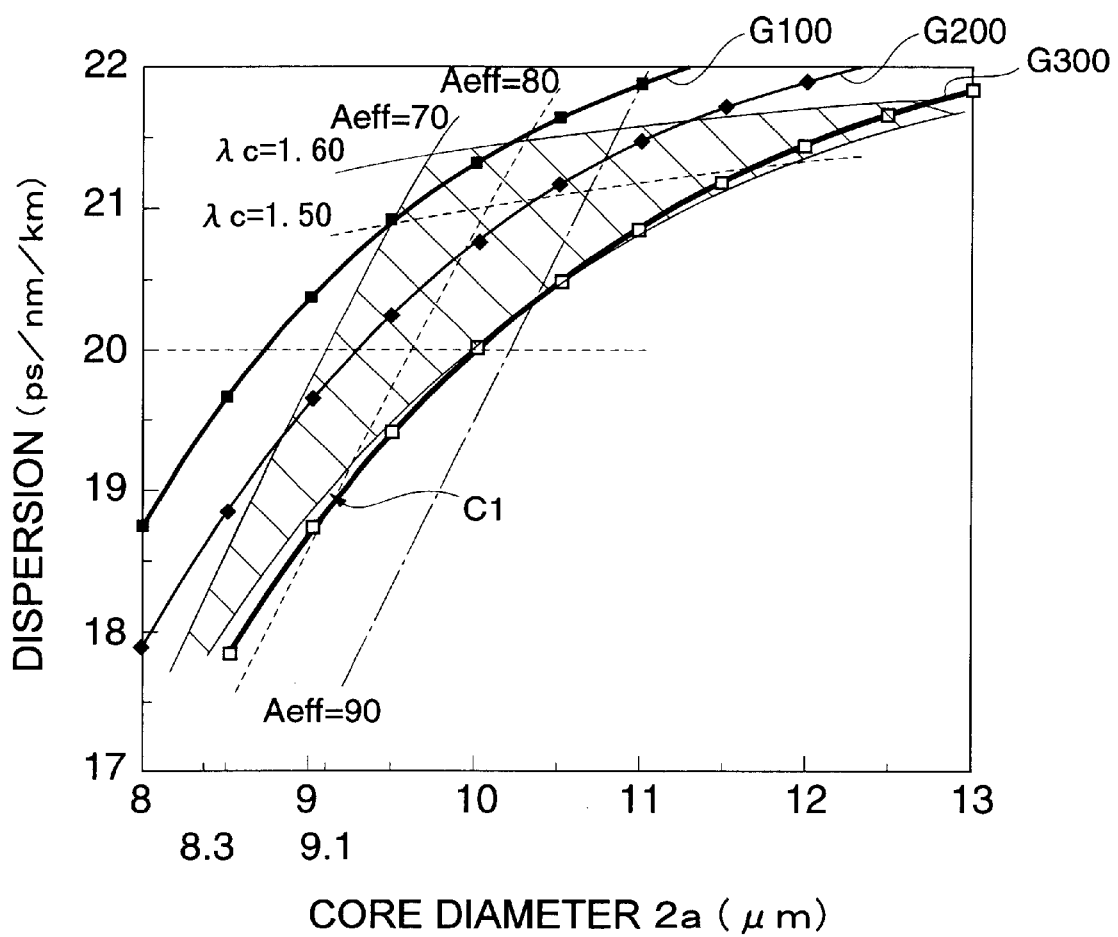
FIG. 3 is a graph showing relationships between the core diameter (outside diameter of the core region) and the dispersion at the wavelength of 1550 nm in the optical fiber according to the first embodiment in the case where the ratio ($2b/2a$) of the outside diameter $2b$ of the inner cladding to the outside diameter $2a$ of the core region is fixed at 4.0, whereas the relative refractive index difference $\Delta^-$ of the inner cladding with respect to the outer cladding is fixed at $-0.09\%$.
Figure 4:
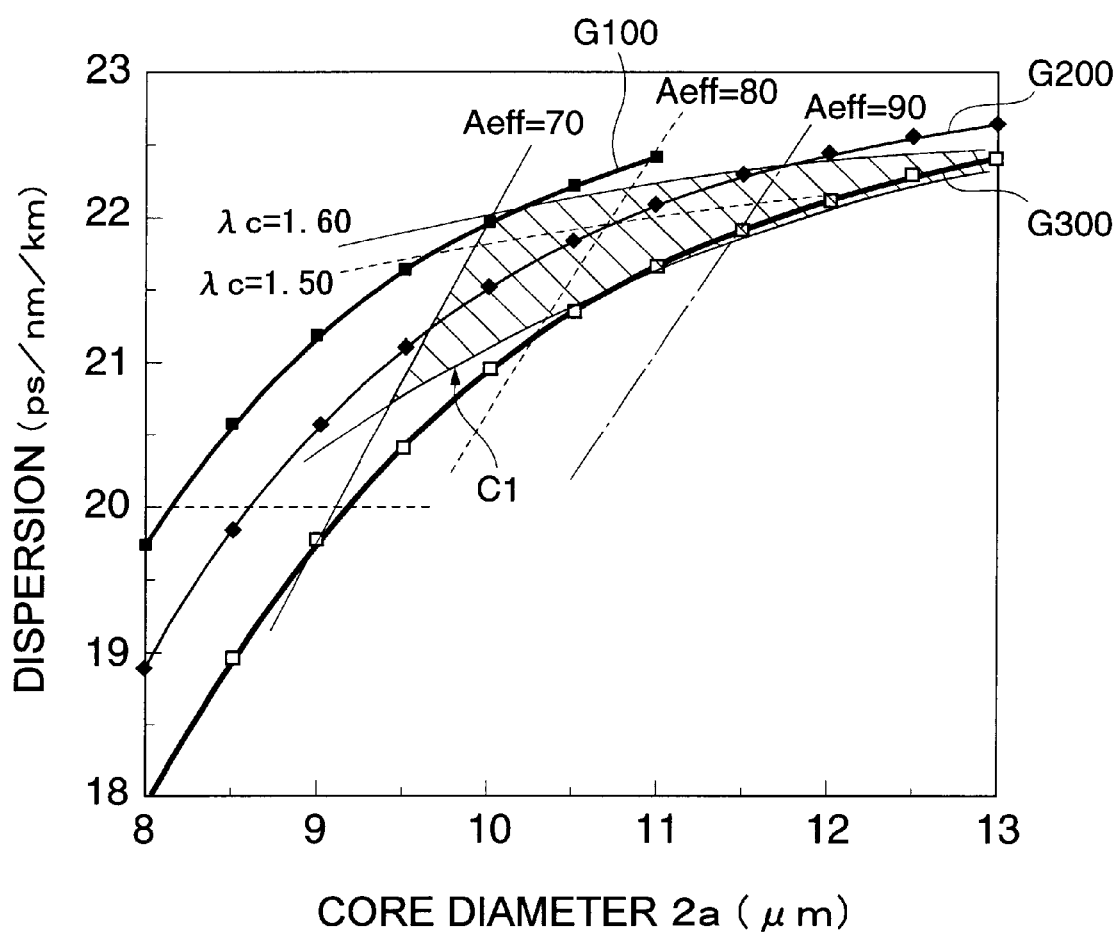
FIG. 4 is a graph showing relationships between the core diameter (outside diameter of the core region) and the dispersion at the wavelength of 1550 nm in the optical fiber according to the first embodiment in the case where the ratio ($2b/2a$) of the outside diameter $2b$ of the inner cladding to the outside diameter $2a$ of the core region is fixed at 4.0, whereas the relative refractive index difference $\Delta^-$ of the inner cladding with respect to the outer cladding is fixed at $-0.20\%$.

FIGS. 2 to 5 are graphs each showing relationships between the outside diameter $2a$ of the core region 110 according to the first embodiment and its dispersion at the wavelength of 1.55 $\mu$m. Here, in the graph of FIG. 2, the ratio ($2b/2a$) of the outside diameter $2b$ of the inner cladding 120 to the outside diameter $2a$ of the core region 110 and the relative refractive index difference $\Delta^-$ of the inner cladding 120 with respect to the outer cladding 130 are fixed at 4.0 and −0.03%, respectively. Also, in the graph of FIG. 3, the ratio ($2b/2a$) of the outside diameter $2b$ of the inner cladding 120 to the outside diameter $2a$ of the core region 110 and the relative refractive index difference $\Delta^-$ of the inner cladding 120 with respect to the outer cladding 130 are fixed at 4.0 and −0.09%, respectively. In the graph of FIG. 4, the ratio ($2b/2a$) of the outside diameter $2b$ of the inner cladding 120 to the outside diameter $2a$ of the core region 110 and the relative refractive index difference $\Delta^-$ of the inner cladding 120 with respect to the outer cladding 130 are fixed at 4.0 and −0.20%, respectively. Further, in the graph of FIG. 5, the ratio ($2b/2a$) of the outside diameter $2b$ of the inner cladding 120 to the outside diameter $2a$ of the core region 110 and the relative refractive index difference $\Delta^-$ of the inner cladding 120 with respect to the outer cladding 130 are fixed at 4.0 and −0.45%, respectively.

In each of FIGS. 2 to 5, G100, G200, and G300 are curves indicating the relationships between the core diameter $2a$ and the dispersion value at the wavelength of 1.55 $\mu$m in the cases where the relative refractive index difference $\Delta^+$ of the core region 110 with respect to the outer cladding 130 is 0.50%, 0.40%, and 0.30%, respectively. C1 is a curve showing the relationship between the core diameter $2a$ and the dispersion value at the wavelength of 1.55 $\mu$m, in which the increase in loss (at the wavelength of 1.55 $\mu$m) in the optical fiber having a total length of 20 km caused by being wound at a diameter of 60 mm becomes 0.01 dB/km. Further, each of FIGS. 2 to 5 shows curves indicating the relationships between the core diameter $2a$ and the dispersion value at the wavelength of 1.55 $\mu$m in the cases where the cutoff wavelength $\lambda$c becomes 1.5 $\mu$m and 1.6 $\mu$m, respectively; and the relationships between the core diameter $2a$ and the dispersion value at the wavelength of 1.55 $\mu$m in the cases where the effective cross-sectional area $A_{eff}$ becomes 70 $\mu$m$^2$, 80 $\mu$m$^2$, and 90 $\mu$m$^2$, respectively. A cutoff wavelength $\lambda$c up to about 1.60 $\mu$m is permissible in the case of an optical fiber having a length of several hundreds of meters, and that up to about 1.70 $\mu$m may be permissible in the case of a longer optical fiber. In each of FIGS. 2 to 5, an area where the cutoff wavelength $\lambda$c is 1.6 $\mu$m or shorter, the effective cross-sectional area $A_{eff}$ is at least 70 $\mu$m$^2$, and the increase in loss (at the wavelength of 1.55 $\mu$m) in the optical fiber having a total length of 20 km caused by being wound at a diameter of 60 mm becomes 0.01 dB/km or less is indicated as a preferable range (hatched area in each graph).

Judging from FIG. 2, in the optical fiber in which the relative refractive index difference $\Delta^-$ of the inner cladding 120 with respect to the outer cladding 130 is −0.03%, when the outside diameter $2a$ of the core region 110 is about 8.3 $\mu$m or greater, then the dispersion at the wavelength of 1.55 $\mu$m can become about 18 ps/nm/km or greater. When the outside diameter $2a$ of the core region 110 is about 9.2 $\mu$m or greater, then the dispersion at the wavelength of 1.55 $\mu$m can become about 20 ps/nm/km or greater. Also, when the outside diameter $2a$ of the core region 110 is about 12.5 $\mu$m, then the dispersion at the wavelength of 1.55 $\mu$m can be increased up to about 21.3 ps/nm/km.

Judging from FIG. 3, in the optical fiber in which the relative refractive index difference $\Delta^-$ of the inner cladding 120 with respect to the outer cladding 130 is −0.09%, when the outside diameter 2a of the core region 110 is about 8.3 μm or greater, then the dispersion at the wavelength of 1.55 μm can become about 18 ps/nm/km or greater. When the outside diameter 2a of the core region 110 is about 9.1 μm or greater, then the dispersion at the wavelength of 1.55 μm can become about 20 ps/nm/km or greater. Also, when the outside diameter 2a of the core region 110 is about 12.5 μm, then the dispersion at the wavelength of 1.55 μm can be increased up to about 21.7 ps/nm/km.

Also, judging from FIG. 4, in the optical fiber in which the relative refractive index difference Δ⁻ of the inner cladding 120 with respect to the outer cladding 130 is −0.20%, when the outside diameter 2a of the core region 110 is about 9.5 μm or greater, then the dispersion at the wavelength of 1.55 μm can become about 20.8 ps/nm/km or greater. Also, when the outside diameter 2a of the core region 110 is about 12.8 μm, then the dispersion at the wavelength of 1.55 μm can be increased up to about 22.3 ps/nm/km.

Figure 5:
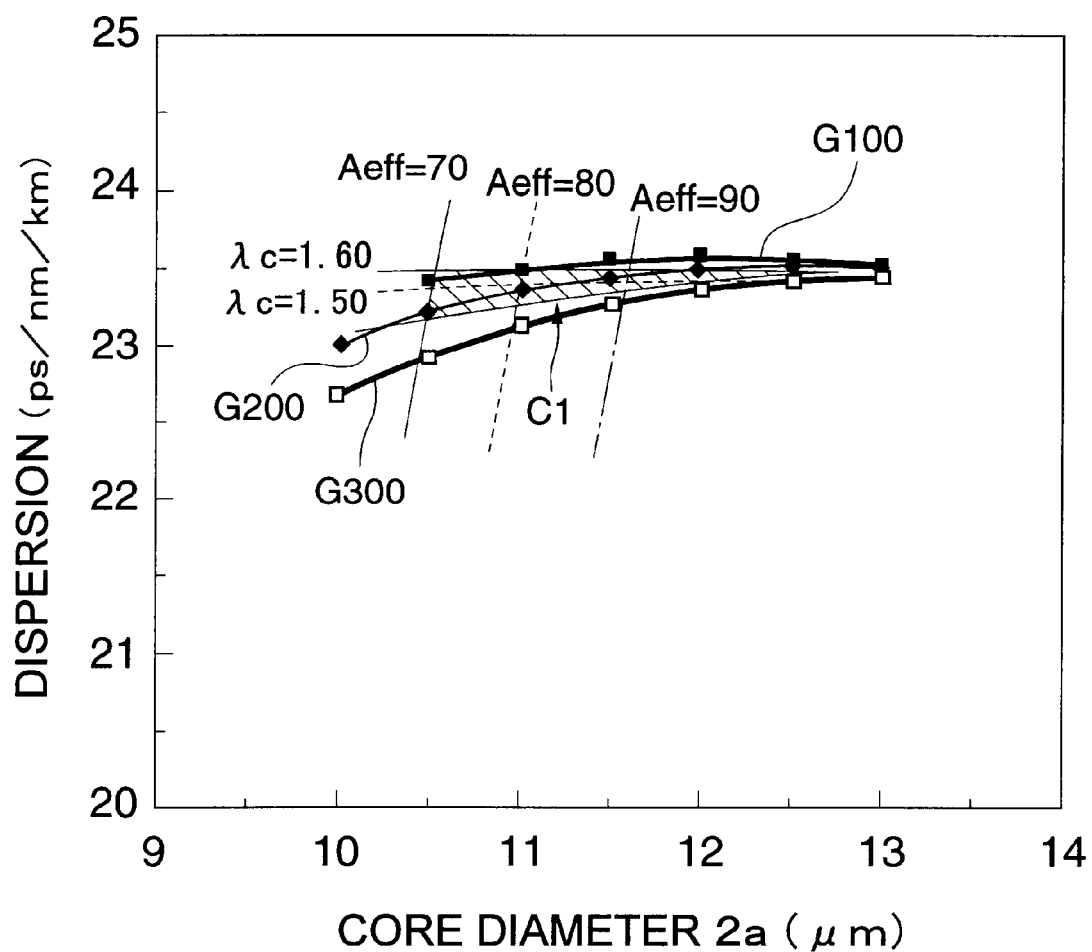
FIG. 5 is a graph showing relationships between the core diameter (outside diameter of the core region) and the dispersion at the wavelength of 1550 nm in the optical fiber according to the first embodiment in the case where the ratio ($2b/2a$) of the outside diameter $2b$ of the inner cladding to the outside diameter $2a$ of the core region is fixed at 4.0, whereas the relative refractive index difference $\Delta^-$ of the inner cladding with respect to the outer cladding is fixed at $-0.45\%$.

Further, judging from FIG. 5, in the optical fiber in which the relative refractive index difference Δ⁻ of the inner cladding 120 with respect to the outer cladding 130 is −0.45%, when the outside diameter 2a of the core region 110 is about 10.5 μm or greater, then the dispersion at the wavelength of 1.55 μm can become about 23.2 ps/nm/km or greater. Also, when the outside diameter 2a of the core region 110 is about 13.0 μm, then the dispersion at the wavelength of 1.55 μm can be increased up to about 23.5 ps/nm/km.

As can be seen from FIGS. 2 to 5 in the foregoing, when the relative refractive index difference Δ⁻ of the inner cladding 120 with respect to the outer cladding 130 is reduced (its absolute value is increased), then the dispersion can be enhanced while keeping the cutoff wavelength λc at the same value.

A plurality of applied examples of the optical fiber according to the first embodiment will now be explained.

To begin with, the optical fiber 100 according to a first applied example has the cross-sectional structure shown in FIG. 1A and the refractive index profile shown in FIG. 1B, whereas the outside diameter 2a of the core region 110, the outside diameter 2b of the inner cladding 120, the relative refractive index difference Δ⁺ of the core region 110 with respect to the outer cladding 130, and the relative refractive index difference Δ⁻ of the inner cladding 120 with respect to the outer cladding 130 are set as follows:

2a (μm): 9.0
2b (μm): 36.0
Δ⁺(%): 0.35
Δ⁻(%): 0.03

Thus designed optical fiber according to the first applied example has, as various characteristics at the wavelength of 1.55 μm, the following optical characteristics:

dispersion (ps/nm/km): 18.7
effective cross-sectional area $A_{eff}$ (μm²): 80.5
dispersion slope (ps/nm²/km): 0.058
transmission loss (dB/km)
when bent at a diameter of 60 mm:: 0.208
polarization mode dispersion PMD (ps·km$^{1/2}$): 0.14

Here, the cutoff wavelength of the optical fiber according to the first applied example at a length of 2 m is 1.25 μm. Also, the above-mentioned transmission loss is the sum of the original transmission loss of the optical fiber and the increase in loss caused by being bent at the diameter of 60 mm.

The optical fiber according to a second applied example also has the cross-sectional structure shown in FIG. 1A, and its refractive index profile has a form similar to that shown in FIG. 1B. Also, this optical fiber of the second applied example is designed with the following features:

2a (μm): 10.5
2b (μm): 42.0
Δ⁺(%): 0.35
Δ⁻(%): −0.03

Thus designed optical fiber according to the second applied example has, as various characteristics at the wavelength of 1.55 μm, the following optical characteristics:

dispersion (ps/nm/km): 20.4
effective cross-sectional area $A_{eff}$ (μm²): 93.2
dispersion slope (ps/nm²/km): 0.060
transmission loss (dB/km)
when bent at a diameter of 60 mm:: 0.204
polarization mode dispersion PMD (ps·km$^{1/2}$): 0.12

Here, the cutoff wavelength of the optical fiber according to the second applied example at a length of 2 m is 1.45 μm. Also, the above-mentioned transmission loss is the sum of the original transmission loss of the optical fiber and the increase in loss caused by being bent at the diameter of 60 mm.

The optical fiber according to a third applied example is designed with the following features:

2a (μm): 10.5
2b (μm): 46.0
Δ⁺(%): 0.35
Δ⁻(%): −0.03

Thus designed optical fiber according to the third applied example has, as various characteristics at the wavelength of 1.55 μm, the following optical characteristics:

dispersion (ps/nm/km): 21.0
effective cross-sectional area $A_{eff}$ (μm²): 103.0
dispersion slope (ps/nm²/km): 0.061
transmission loss (dB/km)
when bent at a diameter of 60 mm:: 0.202
polarization mode dispersion PMD (ps·km$^{1/2}$): 0.12

Here, the cutoff wavelength of the optical fiber according to the third applied example at a length of 2 m is 1.59 μm. Also, the above-mentioned transmission loss is the sum of the original transmission loss of the optical fiber and the increase in loss caused by being bent at the diameter of 60 mm.

Further, the optical fiber according to a fourth applied example is designed with the following features:

2a (μm): 10.0
2b (μm): 40.0
Δ⁺(%): 0.31
Δ⁻(%): −0.03

Thus designed optical fiber according to the fourth applied example has, as various characteristics at the wavelength of 1.55 μm, the following optical characteristics:

dispersion (ps/nm/km): 19.6
effective cross-sectional area $A_{eff}$ (μm²): 98.0
dispersion slope (ps/nm²/km): 0.060
transmission loss (dB/km)
when bent at a diameter of 60 mm:: 0.204
polarization mode dispersion PMD (ps·km$^{1/2}$): 0.12

Here, the cutoff wavelength of the optical fiber according to the fourth applied example at a length of 2 m is 1.31 μm.

Also, the above-mentioned transmission loss is the sum of the original transmission loss of the optical fiber and the increase in loss caused by being bent at the diameter of 60 mm.

Figure 6A:
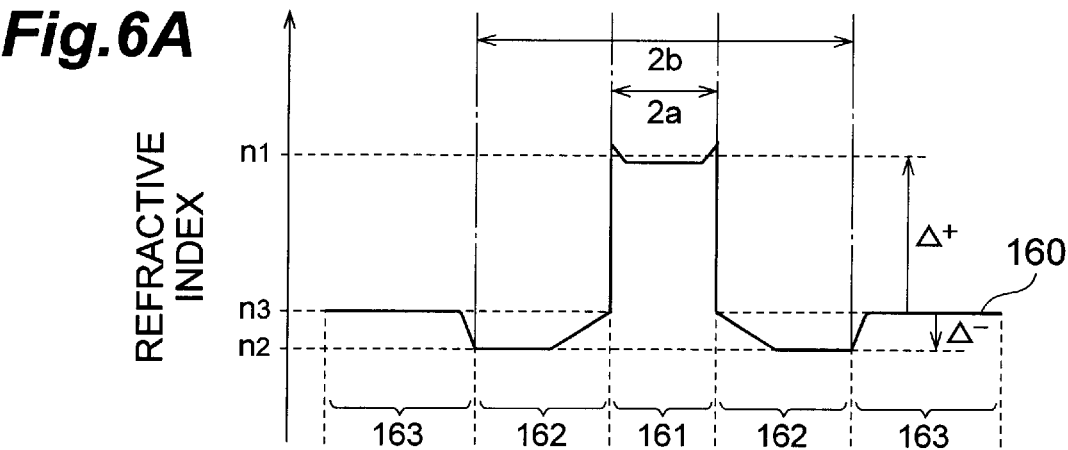

The optical fiber according to a fifth applied example has the cross-sectional structure shown in FIG. 1A and a refractive index profile 160 shown in FIG. 6A. As can also be seen from the form of the refractive index profile 160, in the fifth applied example, the core region 110 has such a form that the center part thereof is depressed from its surroundings and the skirt portions of the core region 110 have an inclined form (form in which the skirt portions extend toward the inner cladding 120). The abscissa of this refractive index profile 160 corresponds to individual parts along the line L in FIG. 1A on a cross section perpendicular to the center axis of the core region 110. Therefore, in the refractive index profile 160, regions 161, 162, and 163 indicate the respective refractive indices in individual parts on the line L in the core region 110 (having the outside diameter $2a$), inner cladding 120 (having the outside diameter $2b$), and outer cladding 130. Here, in the fifth applied example, the relative refractive index difference $\Delta^+$ of the core region 110 with respect to the outer cladding 130 is given by the refractive index $n_3$ of the outer cladding 130 and the average refractive index $n_1$ of the core region 110, whereas the relative refractive index difference $\Delta^-$ of the inner cladding 120 with respect to the outer cladding 130 is given by the refractive index $n_3$ of the outer cladding 130 and the minimum refractive index $n_2$ of the inner cladding 120.

Such an optical fiber according to the fifth applied example is designed according to the following features:

$2a$ ($\mu$m): 10.0
$2b$ ($\mu$m): 45.4
$\Delta^+$(%): 0.34
$\Delta^-$(%): −0.03

Thus designed optical fiber according to the fifth applied example has, as various characteristics at the wavelength of 1.55 $\mu$m, the following optical characteristics:

dispersion (ps/nm/km): 19.5
effective cross-sectional area $A_{eff}$ ($\mu m^2$): 105.0
dispersion slope (ps/nm$^2$/km): 0.062
transmission loss (dB/km)
when bent at a diameter of 60 mm:: 0.198
polarization mode dispersion PMD (ps·km$^{1/2}$): 0.13

Here, the cutoff wavelength of the optical fiber according to the fifth applied example at a length of 2 m is 1.62 $\mu$m. Also, the above-mentioned transmission loss is the sum of the original transmission loss of the optical fiber and the increase in loss caused by being bent at the diameter of 60 mm.

Figure 6B:
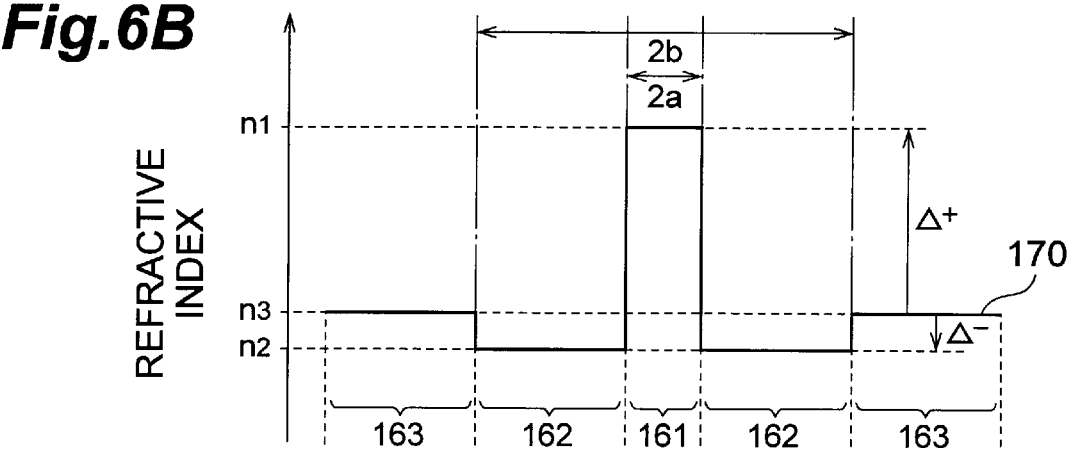
FIG. 6B is a chart showing the refractive index profile of another applied example of the optical fiber according to the first embodiment.

The optical fiber according to a sixth applied example has the cross-sectional structure shown in FIG. 1A and a refractive index profile 170 shown in FIG. 6B. This sixth applied example comprises a core region 110 made of pure silica, and an inner cladding 120 and an outer cladding 130 which are made of F-doped silica. The abscissa of this refractive index profile 170 corresponds to individual parts along the line L in FIG. 1A on a cross section perpendicular to the center axis of the core region 110. Therefore, in the refractive index profile 170, regions 171, 172, and 173 indicate the respective refractive indices in individual parts on the line L in the core region 110 (having the outside diameter $2a$), inner cladding 120 (having the outside diameter $2b$), and outer cladding 130.

Such an optical fiber according to the sixth applied example is designed according to the following features:

$2a$ ($\mu$m): 11.6
$2b$ ($\mu$m): 46.4
$\Delta^+$(%): 0.31
$\Delta^-$(%): −0.05

Thus designed optical fiber according to the sixth applied example has, as various characteristics at the wavelength of 1.55 $\mu$m, the following optical characteristics:

dispersion (ps/nm/km): 20.5
effective cross-sectional area $A_{eff}$ ($\mu m^2$): 99
dispersion slope (ps/nm$^2$/km): 0.060
transmission loss (dB/km)
when bent at a diameter of 60 mm:: 0.172
polarization mode dispersion PMD (ps·km$^{1/2}$): 0.08

Here, the cutoff wavelength of the optical fiber according to the sixth applied example at a length of 2 m is 1.50 $\mu$m. Also, the above-mentioned transmission loss is the sum of the original transmission loss of the optical fiber and the increase in loss caused by being bent at the diameter of 60 mm.

In addition, optical fibers were designed or prototyped under various conditions, and their various characteristics were evaluated. As a result, it has been found that sufficiently large dispersion and effective cross-sectional area $A_{eff}$ are obtained at the wavelength of 1.55 $\mu$m. In particular, it has been found preferable to satisfy the relational expression of $2.0 \leq 2b/2a \leq 6.0$, where $2a$ (unit: $\mu$m) is the outside diameter of the core region, and $2b$ (unit: $\mu$m) is the outside diameter of the inner cladding region. Also, it has been confirmed that the transmission loss (the sum of the original transmission loss of the optical fiber and the increase in loss caused by bending) at the wavelength of 1.55 $\mu$m when wound like a coil at a diameter of 60 mm becomes 0.215 dB/km or less in the optical fiber according to the first embodiment, and that the original transmission loss of the optical fiber at the wavelength of 1.55 $\mu$m becomes 0.180 dB/km or less in further preferable applied examples thereof. Further, it has been found that the polarization mode dispersion at the wavelength of 1.55 $\mu$m is 0.25 ps·km$^{-1/2}$ or less in the optical fiber according to the first embodiment.

Meanwhile, the inventors have experimentally confirmed that providing a carbon coating on the surface of the above-mentioned optical fiber is effective in preventing the optical fiber from breaking.

Figure 7:
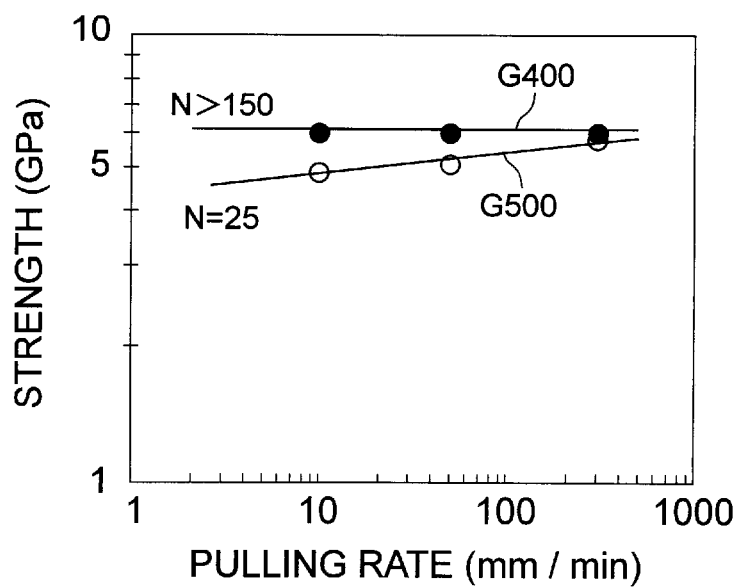
FIG. 7 is a graph showing results of experiments for explaining the breaking prevention effect obtained by carbon coating.

FIG. 7 is a graph showing results of experiments for explaining the breaking prevention effect obtained by carbon coating, in which curve G400 indicates the relationship between the pulling rate (mm/min) and the tensile strength (GPa) when an optical fiber provided with a carbon coating is broken, and graph G500 indicates the relationship between the pulling rate (mm/min) and the tensile strength (GPa) when an optical fiber provided with no carbon coating is broken. Also, while the fatigue index N of the optical fiber provided with the carbon coating exceeded 150, that of the optical fiber provided with no carbon coating was about 25. Here, the breaking strength (Gpa) at the time when the optical fiber is broken has been known to be proportional to the pulling rate (mm/min), at which the optical fiber is pulled, to the [1/(N+1)]-th power as follows:

$$(\text{breaking strength}) = \alpha \times (\text{pulling rate})^{1/(N+1)}$$

where N in the expression is particularly referred to as fatigue index.

As can also be seen from FIG. 7, the difference in breaking strength caused by whether there is a carbon coating or not becomes smaller as the pulling rate increases (i.e., apparently, when pulled faster, flaws are less likely to grow and the fiber is less likely to break even if the same force is applied thereto). However, since actually laid optical fibers are caused to break as being pulled at a very low rate, the optical fiber provided with a carbon coating having a high breaking strength at a low pulling rate is further preferable.

As explained in the foregoing, since the optical fiber according to the first embodiment has a large positive dispersion in the wavelength band of 1.55 μm, it needs only a short length for compensating for the negative dispersion inherent in the NZ-DSF in the wavelength band of 1.55 μm, thus making it possible to reduce the dimensions of a dispersion-compensating module to which this optical fiber is applied. Also, since this optical fiber has a large effective cross-sectional area $A_{\mathit{eff}}$ at the wavelength of 1.55 μm, nonlinear optical phenomena are effectively restrained from occurring. Further, since this optical fiber has a low transmission loss at the wavelength of 1.55 μm when wound like a coil at a diameter of 60 mm, and its polarization mode dispersion at the wavelength of 1.55 μm is small, it is suitable for forming a module.

(Second Embodiment)

Figure 8A:
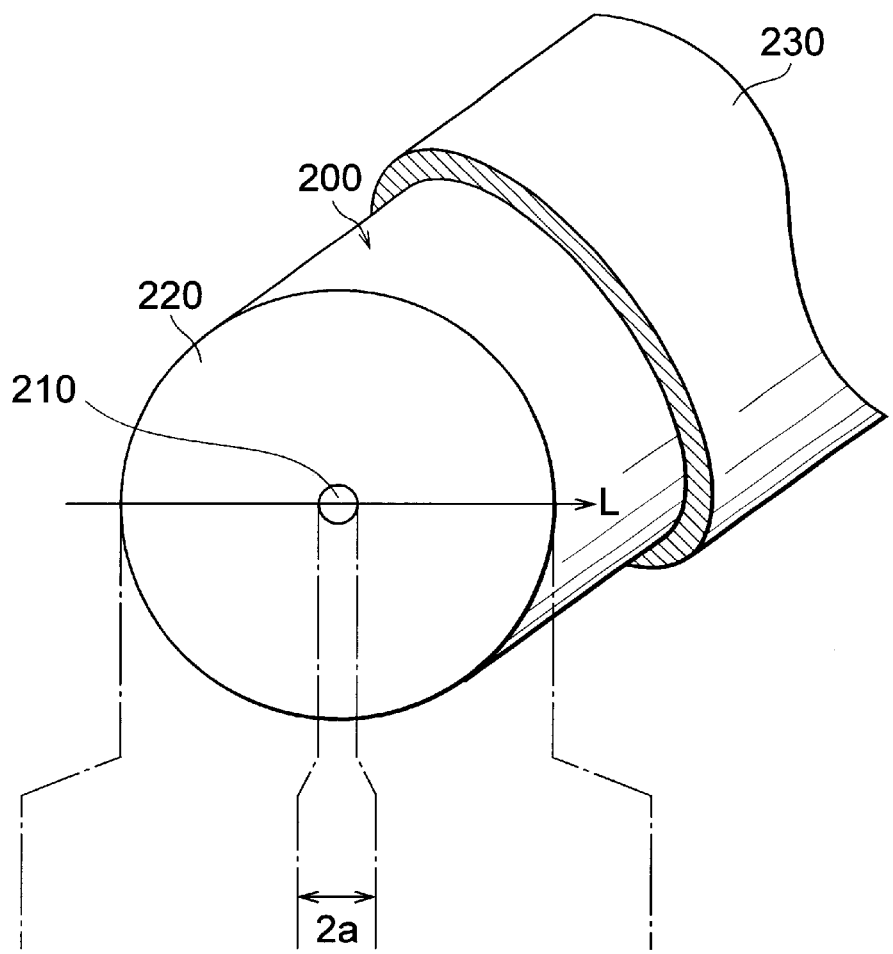
Figure 8B:
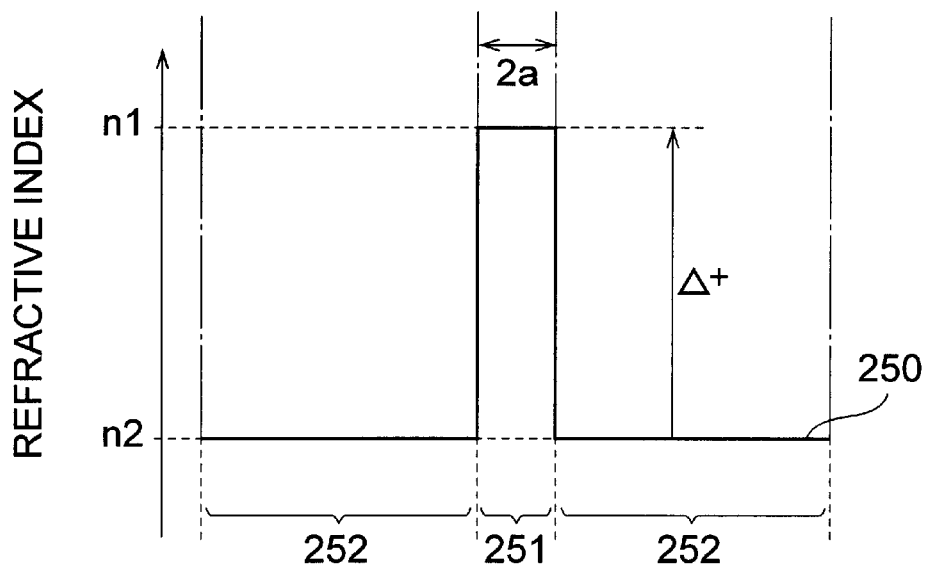
FIG. 8B is a chart showing a refractive index profile of the optical fiber shown in FIG. 8A.

The second embodiment of the optical fiber according to the present invention will now be explained. FIG. 8A is a view showing a cross-sectional structure of the optical fiber according to the second embodiment, whereas FIG. 8B is a refractive index profile of the optical fiber shown in FIG. 8A. The optical fiber 200 according to the second embodiment comprises a core region 210 which extends along a predetermined axis and has a refractive index $n_1$, and a cladding region 220 which is a region disposed at the outer periphery of the core region 210 and has a refractive index $n_2$ ($<n_1$). As a consequence, the relationship of the respective refractive indices of the regions 210, 220 in terms of magnitude is $n_1>n_2$. The outer periphery of the optical fiber 200 according to the second embodiment is provided with a carbon coating 230 in order to effectively prevent the fiber from breaking when formed into a module by being wound like a coil.

The abscissa of the refractive index profile 250 shown in FIG. 8B corresponds to individual parts along the line L in FIG. 8A on a cross section perpendicular to the center axis of the core region 210. Therefore, in the refractive index profile 250 of FIG. 8B, regions 251 and 252 indicate the respective refractive indices in individual parts on the line L in the core region 210 and cladding region 220.

The optical fiber having such a refractive index profile 250 is a single-mode optical fiber based on silica, which can be realized, for example, by adding Ge element to the core region 210. It can also be realized by making the core region 210 with pure silica and adding F element to the cladding region 220. In FIGS. 8A and 8B, 2a indicates the outside diameter of the core region 210, whereas $\Delta^+$ indicates the relative refractive index difference of the core region 210 with respect to the cladding region 220.

Also, in the optical fiber 200 according to the second embodiment, the relative refractive index difference $\Delta^+$ ($=(n_1-n_2)/n_2$) of the core region 210 with respect to the cladding region 220 is at least 0.3% but not greater than 0.5%, the dispersion at the wavelength of 1.55 μm is at least 20 ps/nm/km, the effective cross-sectional area at the wavelength of 1.55 μm is at least 70 μm², and the outside diameter of the core region 210 is at least 9.5 μm but not greater than 12.0 μm.

Figure 9:
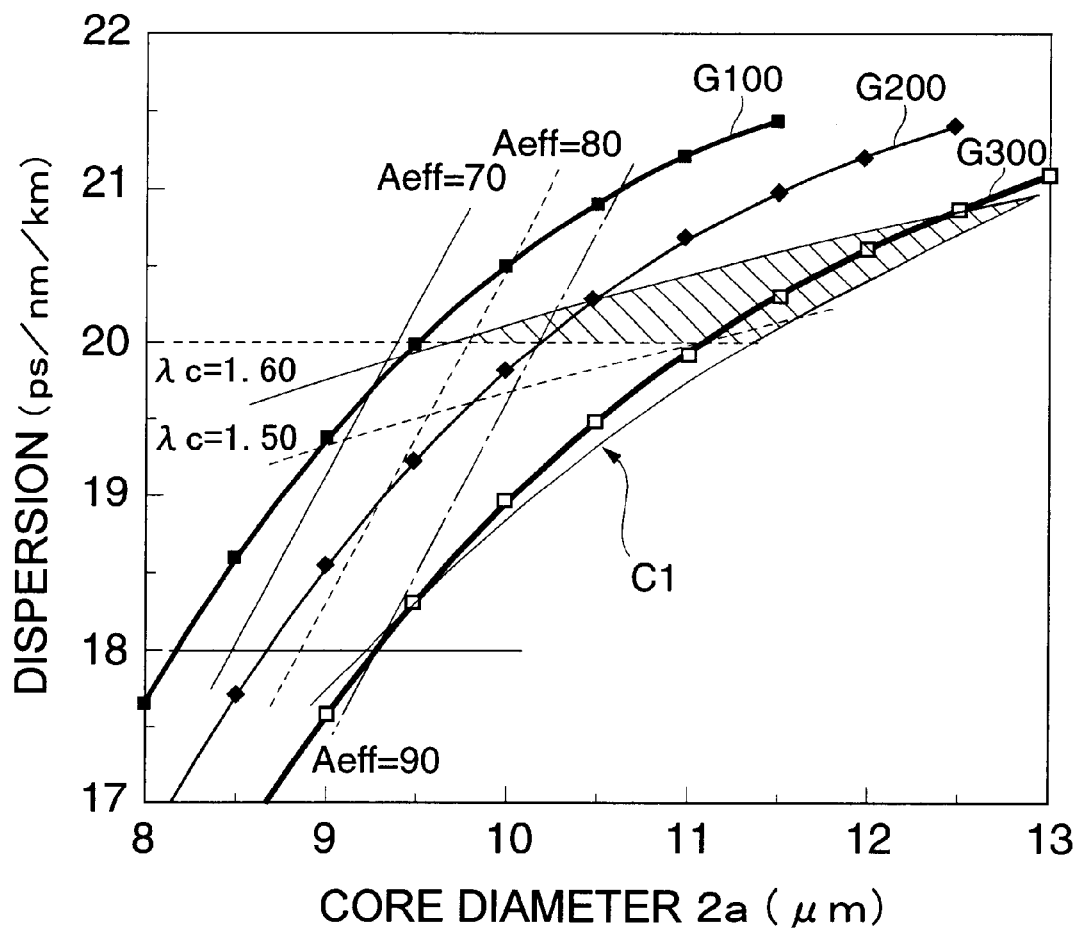
FIG. 9 is a graph showing the relationship between the core diameter (outside diameter of the core region) $2a$ and the dispersion at the wavelength of 1550 nm in the optical fiber according to the second embodiment.

FIG. 9 is a graph showing relationships between the outside diameter 2a of the core region 210 according to the second embodiment and its dispersion at the wavelength of 1.55 μm. In this graph, G100, G200, and G300 are curves indicating the relationships between the core diameter 2a and the dispersion value at the wavelength of 1.55 μm in the cases where the relative refractive index difference $\Delta^+$ of the core region 210 with respect to the cladding region 220 is 0.30%, 0.40%, and 0.50%, respectively. C1 is a curve showing the relationship between the core diameter 2a and the dispersion value at the wavelength of 1.55 μm, in which the increase in loss (at the wavelength of 1.55 μm) in the optical fiber having a total length of 20 km caused by being wound at a diameter of 60 mm becomes 0.01 dB/km. Further, FIG. 9 shows curves indicating the relationships between the core diameter 2a and the dispersion value at the wavelength of 1.55 μm in the cases where the cutoff wavelength λc becomes 1.5 μm and 1.6 μm, respectively; and the relationships between the core diameter 2a and the dispersion value at the wavelength of 1.55 μm in the cases where the effective cross-sectional area $A_{\mathit{eff}}$ becomes 70 μm², 80 μm², and 90 μm², respectively. A cutoff wavelength λc up to about 1.60 μm is permissible in the case of an optical fiber having a length of several hundreds of meters, and that up to about 1.70 μm may be permissible in the case of a longer optical fiber. In FIG. 9, an area where the cutoff wavelength λc is 1.6 μm or shorter, the effective cross-sectional area $A_{\mathit{eff}}$ is at least 70 μm², and the increase in loss (at the wavelength of 1.55 μm) in the optical fiber having a total length of 20 km caused by being wound at a diameter of 60 mm becomes 0.01 dB/km or less is indicated as a preferable range (hatched area in the graph).

Judging from FIG. 9, when the outside diameter 2a of the core region 210 is about 9.5 μm or greater, then the dispersion at the wavelength of 1.55 μm can become about 20 ps/nm/km or greater. When the outside diameter 2a of the core region 210 is about 12.0 μm, then the dispersion at the wavelength of 1.55 μm can be increased up to about 20.7 ps/nm/km.

In the optical fiber 200 according to the second embodiment, the outside diameter 2a of the core region 210 is 11.0 μm, and the relative refractive index difference $\Delta^+$ of the core region 210 with respect to the cladding region 220 is 0.35%. At this time, the cutoff wavelength λc was 1.54 μm, the dispersion at the wavelength of 1.55 μm was 20.3 ps/nm/km, the effective cross-sectional area $A_{\mathit{eff}}$ was 100.0 μm², the dispersion slope was 0.060 ps/nm²/km, the transmission loss when bent at a diameter of 60 mm was 0.210 dB/km (0.215 dB/km or less), and the polarization mode dispersion was 0.10 ps km$^{-\frac{1}{2}}$.

Since the optical fiber according to the second embodiment also has a large positive dispersion in the wavelength band of 1.55 μm, it needs only a short length for compensating for the negative dispersion inherent in the NZ-DSF in the wavelength band of 1.55 μm, thereby being suitable for reducing the dimensions of a dispersion-compensating module to which this optical fiber is applied. Also, since this optical fiber has a large effective cross-sectional area $A_{\mathit{eff}}$ at the wavelength of 1.55 μm, nonlinear optical phenomena are effectively restrained from occurring. Further, since this optical fiber has a low transmission loss (at the wavelength of 1.55 μm) when bent at a diameter of 60 mm, and its polarization mode dispersion at the wavelength of 1.55 μm is small, it is suitable for forming a module.

Without being restricted to the above-mentioned embodiments, the present invention can be modified in various manners. For example, though six specific applied examples are represented as the optical fiber according to the first embodiment, and one specific applied example is represented as the optical fiber according to the second embodiment; without being restricted thereto, various designs are possible within the above-mentioned appropriate ranges.

As explained in the foregoing, since the optical fiber according to the present invention has a large dispersion in the wavelength band of 1.55 μm, it needs only a short length for compensating for the negative dispersion inherent in the NZ-DSF in the wavelength band of 1.55 μm. Consequently, it becomes easy to reduce the dimensions of a dispersion-compensating module to which the optical fiber according to the present invention is applied. Also, since the optical fiber according to the present invention has a large effective cross-sectional area $A_{eff}$ at the wavelength of 1.55 μm, nonlinear optical phenomena are effectively restrained from occurring. Further, since this optical fiber has a transmission loss of 0.215 dB/km or less at the wavelength of 1.55 μm when wound like a coil at a diameter of 60 mm (further preferably, the original transmission loss of the optical fiber excluding the increase in loss caused by bending is 0.180 dB/km or less), and its polarization mode dispersion at the wavelength of 1.55 μm is 0.25 ps·km$^{-\frac{1}{2}}$ or less, it is suitable for forming a module.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber comprising:
    a core extending along a predetermined axis;
    an inner cladding which is a region provided at the outer periphery of said core and has a refractive index lower than that of said core; and
    an outer cladding which is a region provided at the outer periphery of said inner cladding and has a refractive index lower than that of said core but higher than that of said inner cladding;
    wherein the relative refractive index difference of said core with respect to said outer cladding is at least 0.30% but not greater than 0.50%, the relative refractive index difference of said inner cladding with respect to said outer cladding is at least −0.50% but not greater than −0.02%, the dispersion at a wavelength of 1.55 μm is greater than 18 ps/nm/km, and the effective cross-selectional area $A_{eff}$ at the wavelength of 1.55 μm is at least 70 μm$^2$.

2. An optical fiber according to claim 1, wherein said optical fiber satisfies the following relationships:

$$2.0 \leq 2b/2a \leq 6.0$$

$$8.3 \leq 2a \leq 13.0$$

where 2a (unit: μm) is the outside diameter of said core region, and 2b (unit: μm) is the outside diameter of said inner cladding.

3. An optical fiber according to claim 1, wherein said optical fiber has a dispersion greater than 20 ps/nm/km at the wavelength of 1.55 μm.

4. An optical fiber according to claim 3, wherein said optical fiber satisfies the following relationships:

$$2.0 \leq 2b/2a \leq 6.0$$

$$9.1 \leq 2a \leq 13.0$$

where 2a (unit: μm) is the outside diameter of said core region, and 2b (unit: μm) is the outside diameter of said inner cladding.

5. An optical fiber according to claim 1, wherein said optical fiber has a transmission loss which becomes 0.215 dB/km or less at the wavelength of 1.55 μm when wound like a coil at a diameter of 60 mm, and a polarization mode dispersion of 0.25 ps·km$^{-\frac{1}{2}}$ or less at the wavelength of 1.55 μm.

6. An optical fiber according to claim 1, wherein said optical fiber has an effective cross-sectional area of at least 90 μm$^2$.

7. An optical fiber according to claim 1, wherein said optical fiber has a cutoff wavelength of 1.4 μm or longer at a fiber length of 2 m.

8. An optical fiber according to claim 1, wherein said optical fiber has a transmission loss of 0.180 dB/km or less at the wavelength of 1.55 μm.

9. An optical fiber according to claim 1, further comprising a carbon coating provided at the outer periphery of said outer cladding.

10. An optical fiber comprising:
    a core region extending along a predetermined axis and having an outside diameter of at least 9.5 μm but not greater than 13.0 μm; and
    a cladding region which is a region provided at the outer periphery of said core and has a refractive index lower than that of said core region;
    wherein said optical fiber has a relative refractive index difference of said core region with respect to said cladding region of at least 0.3% but not greater than 0.5%, a dispersion greater than 20 ps/nm/km at a wavelength of 1.55 μm, and an effective cross-sectional area of 70 μm$^2$ at the wavelength of 1.55 μm.

11. An optical fiber according to claim 10, wherein said optical fiber has a transmission loss which becomes 0.215 dB/km or less at the wavelength of 1.55 μm when wound like a coil at a diameter of 60 mm, and a polarization mode dispersion of 0.25 ps·km$^{-\frac{1}{2}}$ or less at the wavelength of 1.55 μm.

12. An optical fiber according to claim 10, wherein said optical fiber has an effective cross-sectional area of at least 90 μm$^2$.

13. An optical fiber according to claim 11, wherein said optical fiber has a cutoff wavelength of 1.4 μm or longer at a fiber length of 2 m.

14. An optical fiber according to claim 11, wherein said optical fiber has a transmission loss of 0.180 dB/km or less at the wavelength of 1.55 μm.

15. An optical fiber according to claim 11, further comprising a carbon coating provided at the outer periphery. of said cladding region.

* * * * *

UNITED STATES PATENT AND TRADEMARK OFFICE
CERTIFICATE OF CORRECTION

PATENT NO.   : 6,337,942
DATED        : January 8, 2002
INVENTOR(S)  : Takatoshi Kato et al.

It is certified that error appears in the above-identified patent and that said Letters Patent is hereby corrected as shown below:

<u>Column 14,</u>
Line 40, before "70 $\mu m^2$" insert -- at least --

Signed and Sealed this

Seventh Day of May, 2002

Attest:

Attesting Officer

JAMES E. ROGAN
*Director of the United States Patent and Trademark Office*